United States Patent [19]

Dietrich et al.

[11] Patent Number: 5,006,216
[45] Date of Patent: Apr. 9, 1991

[54] METAL REMOVAL APPARATUS

[75] Inventors: Joseph J. Dietrich, Painesville; Andrew J. Niksa, Concord; James J. Stewart, Chardon, all of Ohio

[73] Assignee: ELTECH Systems Corporation, Boca Raton, Fla.

[21] Appl. No.: 447,294

[22] Filed: Dec. 7, 1989

[51] Int. Cl.$^5$ .................... C25C 7/04; C25B 11/03; C25B 11/10
[52] U.S. Cl. ................... 204/257; 204/263; 204/283; 204/284; 204/290 F; 204/295; 204/296
[58] Field of Search ................... 204/255-258, 204/282-283, 263-266, 290 F

[56] References Cited
U.S. PATENT DOCUMENTS

| | | | |
|---|---|---|---|
| 4,201,653 | 5/1980 | O'Neill et al. | 204/263 |
| 4,229,277 | 10/1980 | Specht | 204/282 X |
| 4,595,477 | 6/1986 | Detournay et al. | 204/282 X |
| 4,615,784 | 10/1986 | Stewart et al. | 204/263 |
| 4,857,162 | 8/1989 | Phillips | 204/263 X |

*Primary Examiner*—Donald R. Valentine
*Attorney, Agent, or Firm*—John J. Freer

[57] ABSTRACT

The present invention resides in part in a process for removing a multivalent metal ion contaminant such as can be found in an acidic waste water. The waste water may also contain one or more extraneous metals such as copper. This process aspect then more particularly involves the steps of (1) simultaneously reducing said multivalent contaminant to a lower valence state and said extraneous metal to a metal state, while at the same time inhibiting reoxidation of the multivalent contaminant to a higher valence state; and (2) removing the multivalent contaminant which has been inhibited from reoxidation.

16 Claims, 3 Drawing Sheets

METAL REMOVAL APPARATUS

BACKGROUND OF THE INVENTION

1. Technical Field

The present invention relates to the removal of multivalent ions such as chromium ions from solution. The present invention also permits removal of additional metal ions species which may be present with the multivalent ions.

2. Description of the Prior Art

There is a considerable and growing concern over pollution of the nation's waterways with various contaminants, such as the heavy metals, e.g., chromium, copper, nickel, zinc, mercury, and cadmium. Many of these pollutants enter the nation's waters from industrial sources such as metal finishing or plating plants and from mining sources. Environmental legislation and regulations on the federal, state and local government levels have set forth maximum allowable concentrations of these contaminants which may be discharged into public waters. A present need exists for an economical, yet effective process for treating such waste waters and removing a substantial portion of the contaminants. This is especially critical for plating plant rinse water which customarily contains more than one of the aforementioned metals.

Aqueous plating solutions containing chromium ions are of particular concern. The major portion of chromium in such solutions exists as hexavalent chromium ($Cr^{+6}$) which is considered to be harzardous and which has long been recognized as a major stream pollutant.

Certain waste water streams typically contain one or more metals in metal ion concentrations less than 1,000 parts per million, often about 500 parts per million or less. The lower the concentration of the metal ion in the stream, the more difficult it is to recover the metal economically. Streams with concentrations less than about 1,000 parts per million are generally referred to as "dilute aqueous metal bearing streams" or "problem streams". There exists a need for equipment that can handle economically the so-called "problem streams" as well as streams containing higher concentrations of metal ions.

The removal of chromium from chrome-containing waste water by precipitation of chromate hydroxide is known in the art. By way of example, prior U.S. Pat. No. 4,260,491 discloses a process for the removal of chrome from waste water, wherein the chromium is in the hexavalent state, by treating the waste water with (1) a reducing agent suitable for converting hexavalent chromium to trivalent chrome and (2) a magnesium, calcium, ferric or aluminum sulfate or chloride salt to promote the precipitation of chromic hydroxide. The problem with this and other processes in which the end product is a chrome (III) hydroxide precipitate is that suitable landfill areas for chromium hydroxide sludge materials are becoming increasingly scarce and increasingly costly. In addition, this disposal of chromium values represents a substantial loss of a valuable material.

Prior U.S. Pat. No. 3,481,851 discloses a process for reconditioning a used chromic acid containing metal treating solution. The used solution contains trivalent chromium. The used solution is introduced as the anolyte solution into an anode compartment of an electrodialysis cell. An acid catholyte solution is introduced into the cathode compartment. A cation permeable membrane separates the two compartments. On energizing the cell, dissolved foreign ions such as copper, iron, zinc, nickel and cadmium selectively pass through the membrane into the catholyte solution and plate onto the cathode. The chromium ions, present as anion complexes, are restricted from passing through the membrane. In the anolyte, the trivalent chrome reoxidizes at the anode into hexavalent chromium. The process is designed to produce hexavalent chromium. The process is not concerned with removal of chromium ions from a spent solution.

U.S. Pat. No. 3,761,369 shows a somewhat similar technique for reclaiming spent etching fluids containing chromium values and additional extraneous metals such as copper. The technique is carried out in two stages in which, in the first stage, the hexavalent chromium is reduced to the trivalent chromium. Following the reduction of the hexavalent chromium, copper metal is plated from the solution onto a cell cathode until the solution is copper free. The solution containing the trivalent chromium values is then transferred to the cell anode chamber where the trivalent chromium is reoxidized to hexavalent chromium. The process also is not concerned with economically recovering chromium ions from a spent electrolyte solution.

A process similar to that of U.S. Pat. No. 3,481,851 is disclosed in U.S. Pat. No. 4,337,129. This patent also discloses an electrolytic cell for regenerating a solution containing trivalent chromium ions, as well as removing extraneous metals such as copper. In this cell, a cation permeable membrane separates the cell into an anolyte chamber containing an anode and a catholyte chamber containing a cathode. The anolyte chamber contains the spent solution. In the process of electrolysis, employing a direct current, cations migrate through the membrane from the anolyte chamber to the catholyte chamber with the extraneous metal plating out on the cathode. The trivalent chromium ions in the anolyte are reoxidized to hexavalent chromium. As with prior U.S. Pat. No. 3,481,851, this patent does not disclose a process for the removal of multivalent ions, as such term is used herein, such as chromium from an electrolyte solution.

Prior U.S. Pat. No. 4,436,601 discloses a process for electrolytically reducing the concentration of metal ions in a waste water stream. The process uses a cell which contains a plurality of anodes and cathodes arranged in alternating sequence in the cell. The anodes are provided with openings therein and the cathodes are in the form of metalized organic polymer foam reticulates. Waste water is circulated through the cell, and metal sought to be removed is cathodically deposited. The process of this patent, however, is only useful for waste steams containing selected metal ions. In the case of streams which contain a multivalent metal ion such as chromium, the ions tend to oxidize at the anodes and be reduced at the cathodes so that no electrolytic removal of the metal takes place. Specifically in the case of chromium, $Cr^{+3}$ is oxidized to $Cr^{+6}$ at the anodes. The reverse reaction takes place at the cathodes. Not only does this impede removal of chromium, but it also hinders plating of whatever selected others metals are contained in the stream.

SUMMARY OF THE INVENTION

The present invention comprise a process for removing a contaminant having multivalent states, such as removal from an acidic waste water. The waste water may contain one or more extraneous or additional metal ion species such as copper. The process thus involves in one aspect a process for removing a multivalent metal ion contaminant from a solution to be treated, said solution containing at least one extraneous metal in ionic form in addition to said multivalent metal ion with said contaminant being present at a higher valance state, said process comprising the steps of:

reducing electrolytically said multivalent metal ion contaminant to a lower valence state and simultaneously reducing electrolytically said extraneous metal ions to a metal state, while at the same time inhibiting reoxidation of reduced multivalent metal ion contaminant to a higher valence state, and removing electrolytically said multivalent metal ion contaminant from said solution.

The process can be conducted in apparatus having at least one anode and at least one cathode in spaced-apart relationship, and diffusion barrier means separating said anode from said cathode and defining an anolyte zone containing said anode and a catholyte zone containing said cathode, said diffusion barrier means effectively reducing access of said multivalent contaminant to the anode. The apparatus comprises inlet and outlet means to pass contaminant, e.g., as contained in a waste stream, into, through, and out of said catholyte zone.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

For purposes of the present application, certain terms shall have the following meanings:

The term "diaphragm" means a barrier which is hydraulically permeable, or permeable to the passage of water or electrolyte wherein the flow is induced by a differential in pressure.

The term "membrane" means a barrier which is ionically permeable, but is not expected to allow passage of water under hydraulic forces. A membrane can be selectively ion permeable.

The term "diffusion barrier" means a barrier which may be permeable to water but which impedes diffusion of ions to or from an electrode. A diaphragm and a selectively ion permeable membrane may be forms of diffusion barriers.

The term "reticulate" means an open pore metal foam which has a high surface area. Reticulate electrodes are further defined in prior U.S. Pat. No. 4,515,672. This disclosure of U.S. Pat. No. 4,515,672 is incorporated herein by reference.

The term "multivalent contaminant" means a metal which may be present in an electrolyte in two or more valence states when in solution. Chromium is a representative multivalent contaminant, and can exist as metal ions in the $Cr^{+6}$ and $Cr^{+3}$ valence states.

The term "extraneous metal ions species" means a metal which is normally in one valence state when in solution in an electrolyte, although other valence states may exist. Examples of extraneous metal ions species are ions of copper, zinc, cadmium, nickel, mercury and lead.

It is to be understood that the "extraneous metal ion species" can include ions of one or more metals in an electrolyte, e.g., a waste water stream, in addition to one or more multivalent contaminants.

The "electrolyte", sometimes also referred to as the "solution", as the terms are used herein, can be any waste water or a waste stream or the like providing ionic conductivity typically by means of the multivalent contaminant and the extraneous metal ions species. The portion of the electrolyte near an anode is the anolyte, and the portion near a cathode, the catholyte. The multivalent contaminant and the extraneous metal ion species may be referred to herein for convenience as the "cations", i.e., positively charged ions and ions which are removed at the cathode.

Figure 1A:
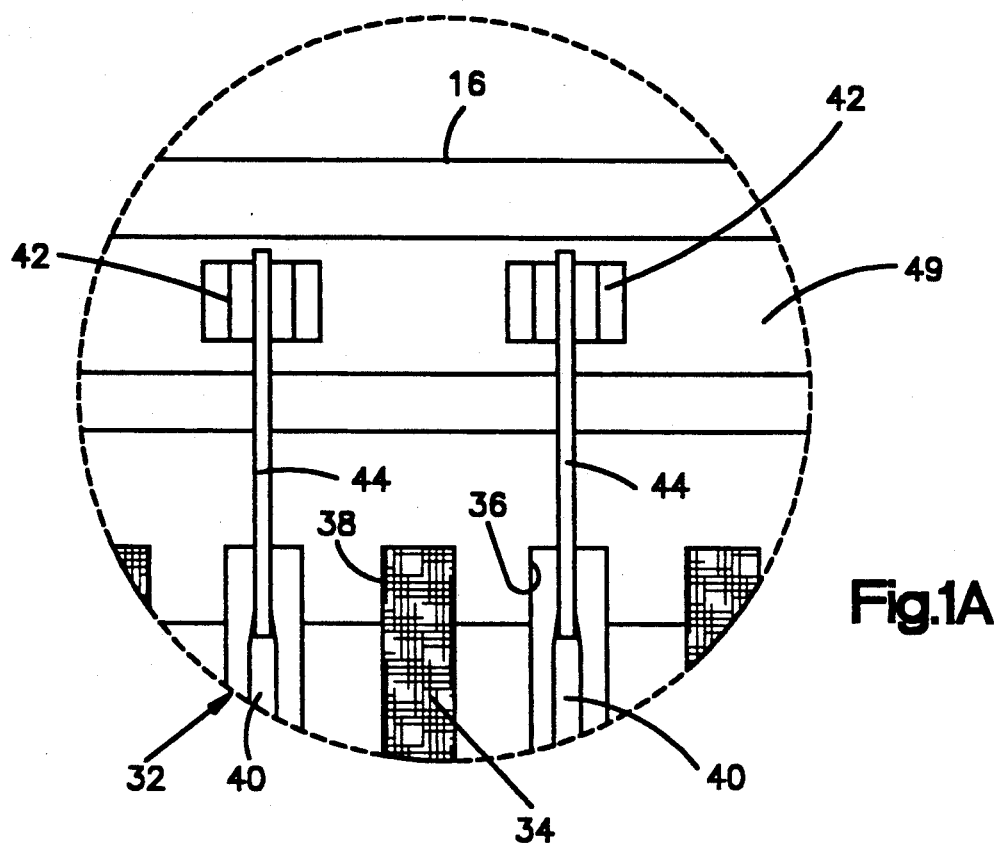
FIG. 1A is an enlarged plan view of a portion of the apparatus of FIG. 1 showing a portion of an anode assembly of the present invention.
Figure 1:
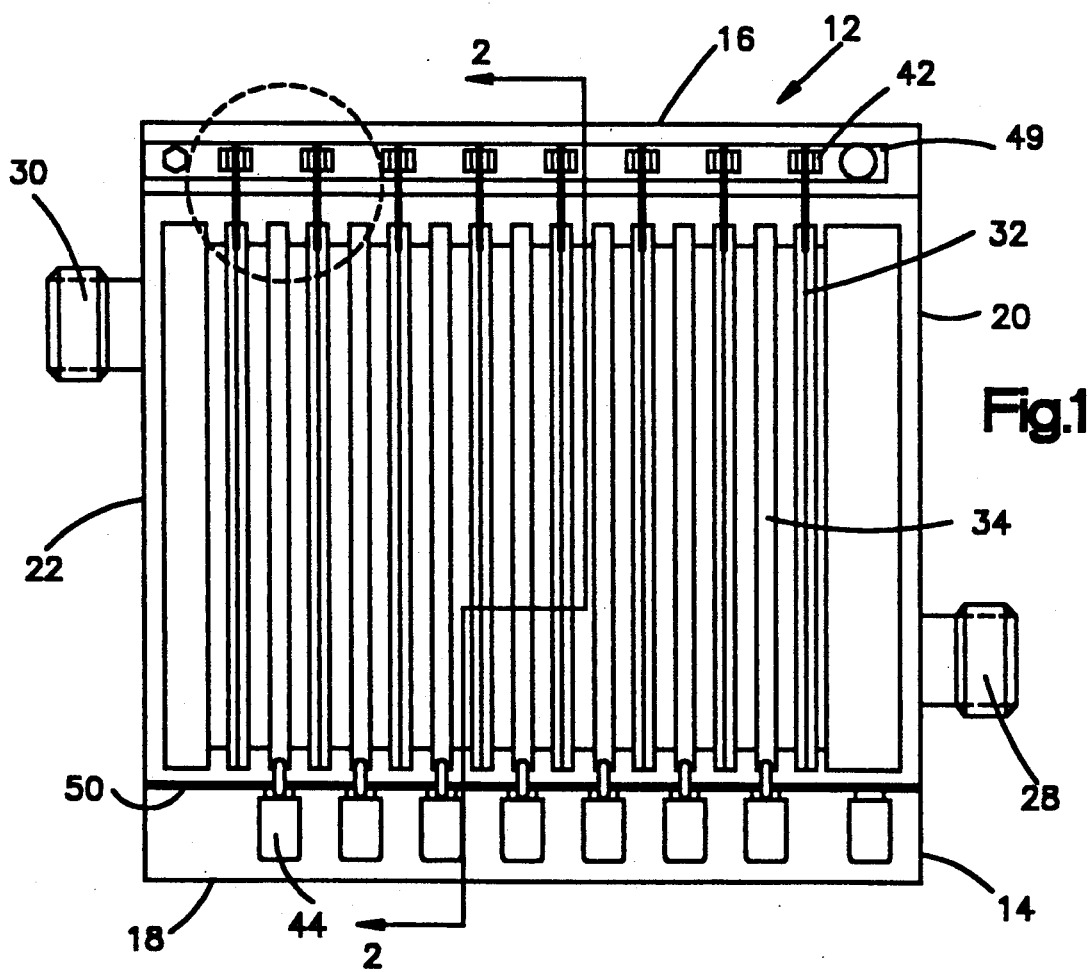
FIG. 1 is a plan view of a representative apparatus useful in accordance with the present invention.
Figure 2:
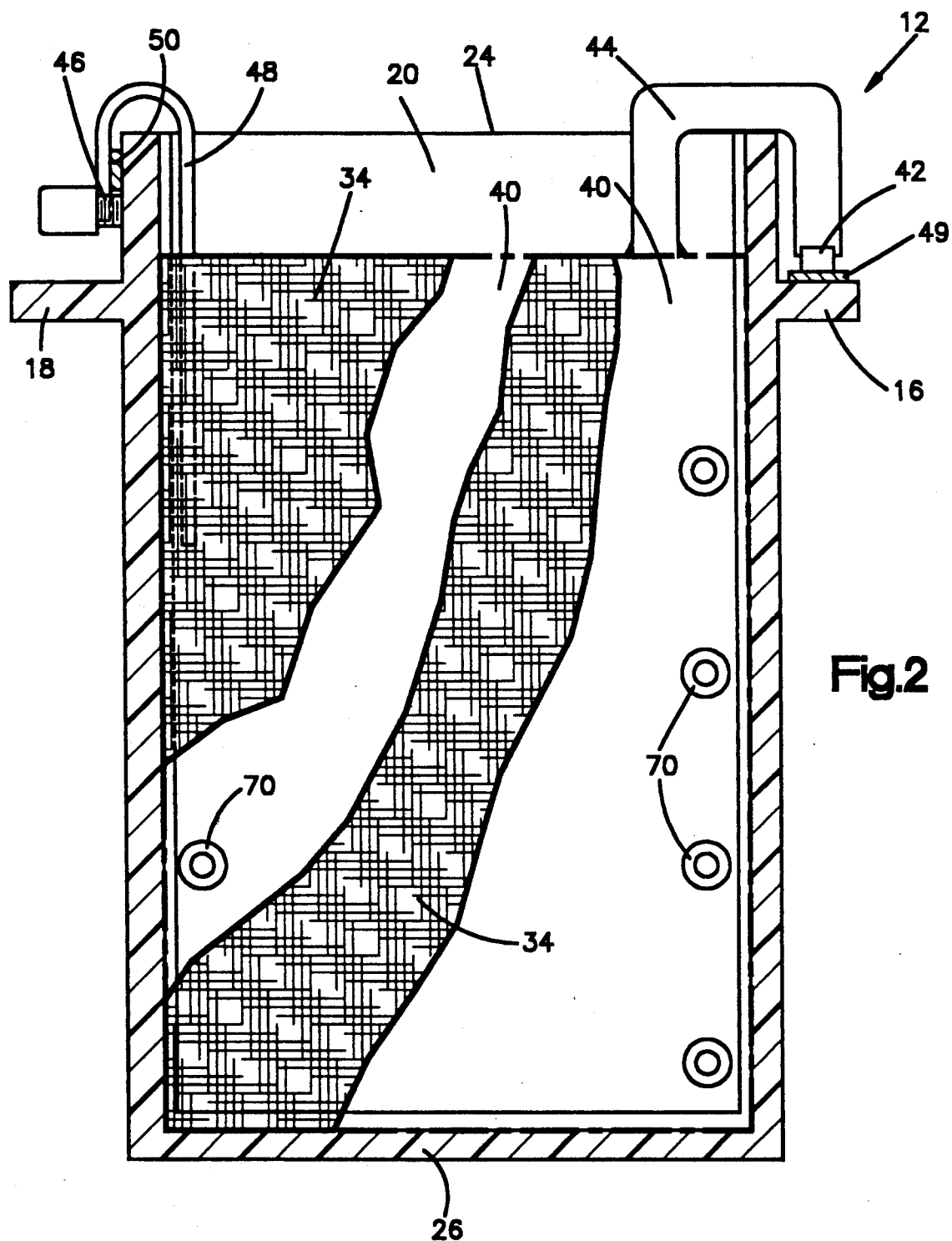
FIG. 2 is a section elevation view of the apparatus of FIG. 1 taken along line 2—2 of FIG. 1.

Referring to FIGS. 1, 1A and 2, representative apparatus, e.g., electrolytic cell 12, comprises an electrically non-conductive, rectangular cell box 14 having side walls 16, 18 (FIG. 2) and end walls 20, 22. The box is open at the top 24 (FIG. 2) and closed on the bottom 26. An inlet 28 is positioned on one of the end walls 20 for the flow of waste water into the box 14 and outlet 30 is positioned on the other end wall 22, for the flow of waste water out of the box 14. The box 14 is fabricated of a material that is inert to chemicals within the cell, and which is electrically nonconductive, such as PLEXIGLAS (registered trademark), polyethylene, polypropylene of polyvinyl chloride. One suitable material for a cell is LUCITE (registered trademark), polymethylmethacrylate.

The box 14 contains a plurality of anode assemblies 32 and cathodes 34 in alternating sequence between the inlet 28 and the outlet 30. In the embodiment illustrated, the anode assemblies 32 and cathodes 34 extend fully across the width of the box 14 between the side walls 16, 18. The anode assemblies 32 are positioned in vertically aligned slots 36 (FIG. 1A) on the inside of side walls 16, 18 and the cathodes 34 are positioned in vertically aligned slots 38 on the inside of the walls 16, 18. Each of the anode assemblies comprises an anode 40. Each anode 40 is connected to a bus connection 42 by a connector tab 44 (FIGS. 1A, 2 and 3) and each of the cathodes 34 is connected to a bus connection 46 by a connector pin 48. All of the anode bus connections 42 are at the side wall 16 of the box 14 and all of the cathode bus connections 46 are at the side wall 18. The bus connections 42 for the anodes are all mounted on an anode bus 49 on a side wall flange 76 (FIG. 2) and all of the bus connections 46 for the cathodes are mounted on a cathode bus 50 above a side wall flange 78.

Figure 3:
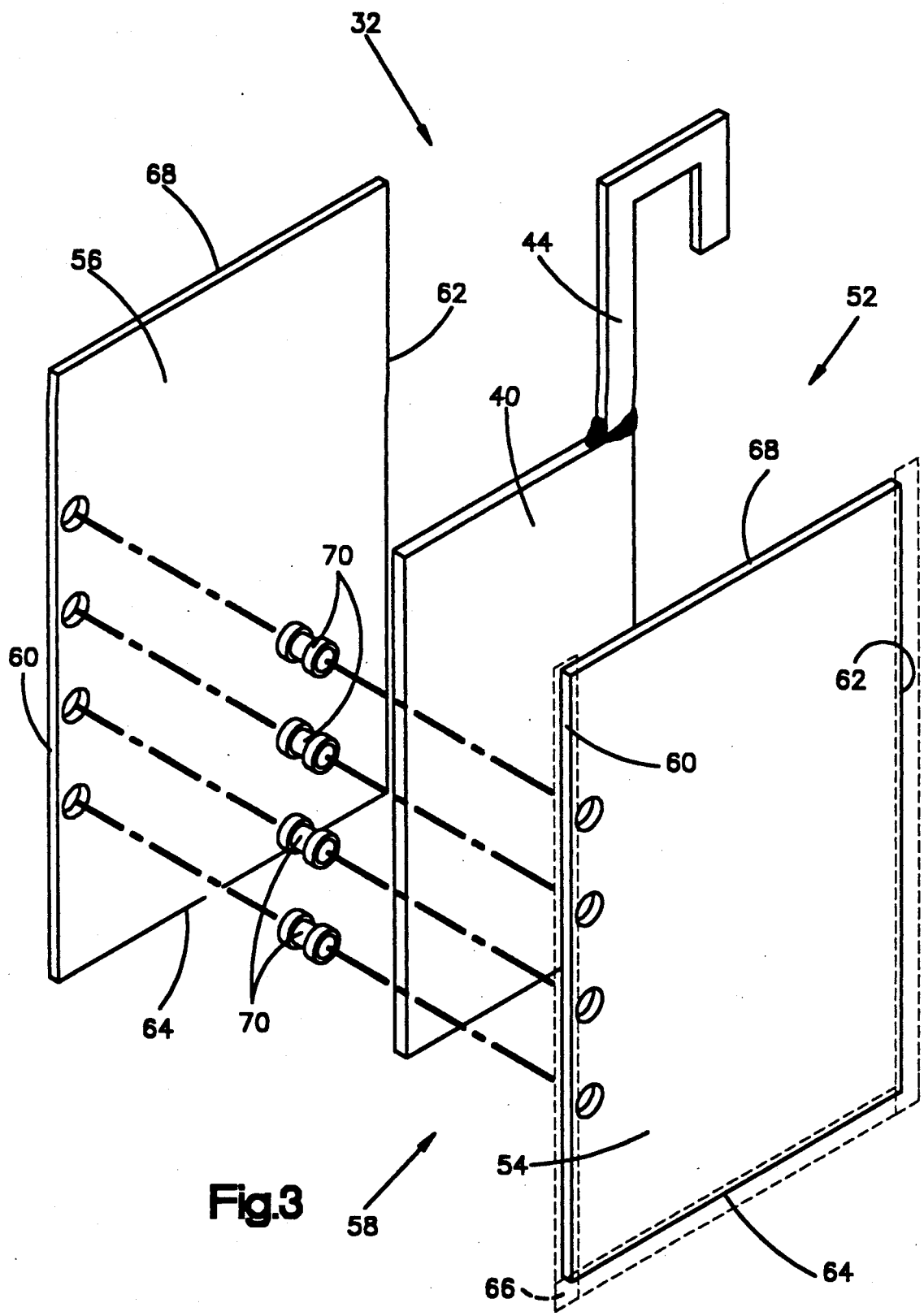
FIG. 3 is an exploded isometric view of an anode assembly useful in accordance with the present invention.

FIG. 3 is an exploded view of an anode assembly 32 in accordance with the present invention. The anode 40 of this representative assembly 32 is of the dimensionally stable type. The anode 40 can be a solid plate, as shown in FIG. 3, or foraminous, e.g., an expanded metal mesh. A solid plate is preferred in the present invention. The plate comprises a substrate material such as titanium or other valve metal such as tantalum, zirconium or niobium and a coating. As representative of the coatings are those provided from platinum or other platinum group metals or they can be represented by active oxide coatings such as platinum group metal oxides, magnetite, ferrite, cobalt spinel or mixed metal oxide coatings. Such coatings have typically been developed for use as anode coatings in the industrial electrochemical industry. Suitable coatings of this type have teen generally described in one or more of the U.S. Pat. Nos. 3,265,526, 3,632,498, 3,711,385 and 4,528,084. The mixed metal oxide coatings can often include at least one oxide of a valve metal with an oxide of a platinum group metal including platinum, palladium, rhodium, iridium and ruthenium or mixtures of themselves and with other metals. It is preferred for economy that the low load electrocatalytic coatings be such as have been disclosed in the U.S. Pat. No. 4,528,084.

Each anode 40, in the embodiment illustrated in FIG. 3, is contained within an envelope 52, comprising sides 54 and 56 which define an anolyte zone or chamber 58. The envelope 52 is sealed along edges 60 and 62, and bottom 64 by an adhesive strip 66 shown in dashed lines. The envelope 52 is open at its top 68. The edge 60 of the envelope is penetrated by hollow plugs 70 arranged in a vertical array along the edge 60. The plugs 70 are made of an elastomeric material resistant to the electrolyte, e.g., a fluorinated rubber such as marketed under the trademark VITON. The plugs 70 being hollow provide passageways, or ports, along the side of the envelope 52 and allow the waste water to flow through the envelope 52, but not into the envelope. Successive envelopes 52 can have the plugs 70 along opposite edges. Thus, the envelope of the next anode assembly 32 in the box 14 has the plugs 70 along the opposite edge 62. In this way, the waste water flows in an undulating path through the box 14, from one side 18 of the box to the other side 16, and back.

The envelope 52 in the present invention is a diffusion barrier. It is made of a porous material which impedes the passage of ions of a multivalent contaminant such as trivalent chromium ions. It may or may not be hydraulically permeable. Any barrier material which impedes the contact of such metal ions with the anode and which is inert to the composition of the electrolyte solution, can be employed. By being inert it is meant the material is not readily degraded by contact with the electrolyte so that it at least substantially maintains its structural integrity during electrolyte contact. One suitable such material is a sheet of a fluorocarbon polymer such as polyvinylidene fluoride. Such sheets are marketed by Porex Technologies under the trademark "POREX". The sheets have a typical thickness of 1/16 inch, or less, which thickness is usually less than about ¼ inch, an average pore size not substantially above about 50 microns, e.g., typically on the order of about 25 microns, and a density at 40% void volume of about 1.05 grams per cubic centimeter. The material is naturally hydrophobic and must be made hydrophilic so that an aqueous solution can pass through it. This can usually be done by use of an electrolyte under hydraulic pressure.

It is understood that instead of an envelope that envelopes the anode as in the embodiment of the drawings, the diffusion barrier can comprise a diaphragm material or selectively ion permeable material applied directly to and bonded to the surface of the anode, thereby encasing the anode. Bonding can be by any conventional means known in the art, for instance, by spray application of the diffusion barrier. In the case of an envelope bonded to the surface of the anode, the anolyte chamber can comprise the pores of the diffusion barrier adjacent the surface of the anode.

Other materials which can be used as a diffusion barrier in the present invention are asbestos, polypropylene filter cloth or similar material, crosslinked functional copolymers of vinyl compounds, perfluoro- functional polymers, Nafion (trademark DuPont), and ceramics as diaphragms or membranes deposited on or applied to the anode so as to enclose it. A diffusion barrier of particular interest is one provided by composite inorganic/polymer fibers having organic particulates impacted into polymer fibers during polymer fiber formation. Such fibers have been more particularly described in U.S. Pat. No. 4,853,101.

The thickness of the diffusion barrier is not critical and will be different with different materials. By way of example, it can range from about 0.003 inch for a selectively ion permeable membrane deposited on the anode to about 0.5 inch for a diaphragm deposited on the anode.

In the practice of the present invention in the embodiment illustrated, the envelope 52 can be charged, from the top, with an anolyte solution which may be the same as the waste water, or different than the waste water, capable of generating oxygen at the anode.

Although the use of various types of foraminous cathodes are contemplated, e.g., expanded mesh, woven wire screen, perforated plates or other apertured structures, cathodes 34 are preferably reticulated electrodes such as described in prior U.S. Pat. No. 4,436,601. The disclosure of this patent is incorporated by reference herein. The reticulated electrodes are porous reticulated electrodes that are at least substantially metallic in structure and have the appearance of a porous foam. The use of reticulated cathodes is particularly desirable when utilizing undulating flow of waste water in cell 12 to pass through the cathodes. For undulating flow, reticulated cathodes can extend fully across the cell, as shown in FIG. 1. If desired, the cathodes can extend only partially across the cell allowing some waste water to bypass the cathodes. In either event, it is desirable for the waste water to travel in an undulating path from the inlet 28 to the outlet 30 directed in a manner such as by the use of hollow anode flow plugs 70 as shown in FIG. 3. Alternatively, the anolyte zone or chambers 58 can be formed so as to extend only partially across the cell 12 with successive anodes 40 being spaced from one cell side wall 16 and then the opposite cell side wall 18. In this way the flow of waste water through the cell 14 is diverted into an undulating path from inlet 28 to outlet 30. This can also be accomplished by spacing successive anode assemblies from the bottom of the cell and the top of the electrolyte bath so that the flow is alternately below and over an anode assembly. By using an undulating flow, maximum contact of the waste water with the large surface area of the reticulated cathodes is achieved.

FIG. 2 illustrates a reticulated cathode 34 in accordance with the present invention. Although the present invention is not limited to any particular type of cathode, a preferred cathode is made by metallizing copper or other metal electrolytically onto an organic polymer foam such as a porous polyurethane substrate. An example of such a form is Scott Industrial Foam (trademark) which has been made conductive.

In the process of the present invention, waste water containing at least one multivalent contaminant and one or more extraneous metal ion species is introduced into the cell at inlet 28 and is continuously circulated through the cell. The waste water first contacts an anode assembly 32 bypassing the anode 40 by means of plugs 70. The waste water then contacts a reticulated cathode 34. The cathode 34 can be typically separated from anode 40 by a distance of about ½ inch, although the amount of separation may vary, e.g., from less than ¼ inch to an inch or more. At the first cathode 34, some of the multivalent contaminant, e.g., hexavalent chromium as a representative contaminant, is reduced to trivalent chromium, and oxygen is evolved at the anode 40. The flow contacts substantially the full surface area of the cathode since the next anode assembly 32 has plugs 70 along the opposite side wall of the cell. The flow then passes through the second cathode 34 of the cell and past another anode assembly 32 following an undulating path through the entire length of the cell.

In this representative process, during the reduction of the hexavalent chromium ions to the trivalent state, extraneous metal ion species such as divalent copper ions may be reduced to the corresponding metal, for instance, copper metal, plating onto the cathodes. Most of the extraneous metal ion species plating, for instance copper plating, will take place after substantially all of the $Cr^{+6}$ has been reduced to $Cr^{+3}$. After typically the majority of the copper metal is plated in this representative process, the chromium is removed at the cathode of the cell. During this entire process, the anode diffusion barrier impedes the reoxidation of the trivalent chromium cations to hexavalent chromium cations at the cell anodes.

It is to be understood that although the representative structure of the figure has anodes and cathodes in sequence and is preferred, other structures may be suitably employed, e.g., more simplistic single cathode structure, a representation of which is more particularly described hereinbelow in the example. Such structural simplification can also lead to the use of aqueous solutions, i.e., electrolytes, of differing makeup, but used within the recovery apparatus, also as discussed in the example. Also, serviceable structure may include additional elements such as baffles or weirs which can be particularly utilized to divert fluid flow around or between the anolyte and catholyte zones present within the metal recovery apparatus.

The following Example illustrates the present invention.

EXAMPLE

An open-topped electrolytic cell measuring approximately five inches by five inches by five inches in height fabricated from LUCITE (registered trademark) polymethylmethacrylate was separated into three chambers by two diffusion barriers made of POREX (trademark) sheet material X-4732. The POREX sheets were made of polyvinylidene fluoride and had a thickness of 1/16 inch and an average pore size of about 25 microns. The typical density at 40% void volume was 1.05 grams per cubic centimeter. The three chambers had substantially the same dimensions. The center chamber was the catholyte compartment and contained a copper metallized foam reticulate cathode such as described in prior U.S. Pat. No. 4,436,601. The end chambers were the anolyte compartments. The anolyte compartments contained titanium plate anodes coated with a TIR-2000 (trademark, ELTECH Systems Corporation) iridium/tantalum anode coating. The center catholyte chamber was provided with fluid inlet and outlet connections. A sulfuric acid aqueous electrolyte at pH of about 3 containing initially 517 parts per million copper ions and 218 parts per million hexavalent chromium ions was continuously passed through the center catholyte chamber by means of the inlet and outlet connections. The amount of the electrolyte was 500 ml. The composition had initially a clear yellow appearance attributed to the hexavalent chromium. A current of about 0.25–0.5 amp at about 5–10 volts was passed between the anodes and the cathode. The anolyte was a dilute sulfuric acid aqueous solution having a pH of about 2.

After about 19 hours of circulation, the electrolyte was converted to a clear light green/blue color and contained less than about 0.3 part per million copper and about 110 parts per million trivalent chromium. After about 22 hours of circulation, the electrolyte solution became almost clear, having a trivalent chromium ion concentration of less than about 0.9 part per million and a copper ion concentration of less than about 0.3 part per million. From the somewhat coppery appearance of the cathode, ostensibly all plating as determined by visual inspection was at the cathode.

From the above description of a preferred embodiment of the invention, those skilled in the art will perceive improvements, changes and modifications. Such improvements, changes and modifications within the skill of the art are intended to be covered by the appended claims.

What is claimed is:

1. An electrolytic cell for reduction of metal ions comprising:
   an electrically non-conductive cell box;
   spaced-apart inlet and outlet means to pass an electrolyte containing metal ions into, through and out of said cell box;
   at least one electrocatalytically coated, valve metal anode extending across said cell box;
   at least one openly porous and metallic reticulated cathode extending across said cell box;
   means positioning said anode and said cathode in said box in a spaced-apart relationship sequentially arranged between said box inlet and box outlet means; and
   diffusion barrier means in the form of a diffusion barrier envelope enveloping said anode and separating said anode from said cathode and from said inlet and outlet means, said diffusion barrier means defining an anolyte zone containing said anode and a catholyte zone in flow communication with said inlet and outlet means containing said cathode, said diffusion barrier means impeding the access of metal ions to the anode and including means for flow of electrolyte through said cell bypassing said anolyte zone.

2. The cell of claim 1, comprising a plurality of anodes and cathodes arranged sequentially in said cell wherein said anodes and cathodes extend across the cell said anode envelopes comprising passageways therethrough for the flow of electrolyte in an undulating fashion through said cell.

3. The cell of claim 2, wherein said passageways comprise ports situated along one edge of each anode envelope.

4. The cell of claim 1, wherein said diffusion barrier means is a sheet of inert, porous polymeric material.

5. The cell of claim 4, wherein said inert, porous polymeric material is hydrophobic and is made hydrophilic for operation of said cell.

6. The cell of claim 4, wherein said inert, porous polymeric material is a diaphragm diffusion barrier means having a thickness of less than about ¼ inch and an average pore size of not substantially above about 50 microns.

7. The cell of claim 1, wherein said diffusion barrier means is a sheet of inert, porous inorganic/polymer composite fibers.

8. The cell of claim 1, wherein said cell box contains electrolyte having multivalent metal ion contaminant plus extraneous metal in ionic form.

9. The cell of claim 1, wherein said diffusion barrier means is one of a diaphragm diffusion barrier means or membrane diffusion barrier means and said diffusion barrier means is placed against said anode.

10. An electrode envelope comprising an electrocatalytically coated valve metal electrode contained within porous diffusion barrier means wherein said envelope is apertured with passageways therethrough for the flow of electrolyte through an electrolytic cell.

11. The envelope of claim 2, wherein said passageways comprise ports situated along one edge of each electrode envelope.

12. The envelope of claim 10, wherein said diffusion barrier means inhibits the passage therethrough of multivalent metal ion contamination contained in said electrolyte.

13. The envelope of claim 10, wherein said diffusion barrier means comprises a sheet of inert, porous inorganic/polymeric composite fibers.

14. The envelope of claim 10, wherein said valve metal electrode is contained within, but spaced apart from said porous diffusion barrier means.

15. The envelope of claim 10, wherein said valve metal electrode is contained within, and placed against, said porous diffusion barrier means.

16. An electrolytic cell for removing a metal contaminant having multivalent states from acidic waste water comprising:
an electrically non-conductive cell box;
spaced apart inlet and outlet means to pass an electrolyte containing said metal contaminant into, through and out of said box;
a plurality of electrocatalytically coated valve metal anodes extending across said box;
a plurality of openly porous and metallic reticulated cathodes extending across said box;
means positioning said anodes and said cathodes in said box in a spaced-apart relationship sequentially arranged between said box inlet and box outlet means; and
diffusion barrier means in the form of a plurality of diffusion barrier envelopes enveloping said anodes separating said anodes from said cathodes and from said inlet and outlet means, said diffusion barrier means defining a plurality of anolyte zones containing said anodes and a plurality of catholyte zones in flow communication with said inlet and outlet means and containing said cathodes, said diffusion barrier means impeding the access of metal ions to said anodes and including means for flow of electrolyte through said cell bypassing said anolyte zones.

* * * * *